United States Patent [19]

Melchior

[11] Patent Number: 4,623,322

[45] Date of Patent: Nov. 18, 1986

[54] MECHANICAL DRIVE WITH BI-DIRECTIONAL OVERRIDE

[75] Inventor: Robert A. Melchior, Southbury, Conn.

[73] Assignee: North American Philips Corporation, New York, N.Y.

[21] Appl. No.: 99,801

[22] Filed: Dec. 3, 1979

[51] Int. Cl.$^4$ ............................ F16D 1/12; F16D 3/10
[52] U.S. Cl. ....................................... 464/160; 464/51; 74/411
[58] Field of Search ............. 74/411, 470; 64/DIG. 2, 64/27 C, 27 R, 27 B, 27 CT, 27 L, 27 S; 464/51, 160

[56] References Cited

U.S. PATENT DOCUMENTS

| 296,013 | 4/1884 | Johnson | 64/27 S |
|---|---|---|---|
| 795,360 | 7/1905 | McCormack | 74/411 |
| 1,457,711 | 6/1923 | Mikkelson | 64/DIG. 2 |
| 1,517,285 | 12/1924 | Fischedick et al. | 74/411 X |
| 1,633,209 | 6/1927 | Henninger | 74/411 X |
| 1,855,746 | 4/1932 | LaBar | 74/411 X |
| 2,300,720 | 11/1942 | Wooldridge | 64/27 C |
| 2,317,490 | 4/1943 | Simpson | 74/411 |
| 2,386,706 | 10/1945 | Moessinger | 74/470 X |
| 2,688,882 | 9/1954 | Alexy | 74/411 X |
| 3,952,545 | 4/1976 | Koeslin | 64/27 C |

FOREIGN PATENT DOCUMENTS

| 406934 | 12/1924 | Fed. Rep. of Germany | 64/DIG. 2 |
|---|---|---|---|
| 2810960 | 9/1978 | Fed. Rep. of Germany | 74/411 |
| 585336 | 12/1977 | U.S.S.R. | 64/27 S |

Primary Examiner—Lawrence Staab
Attorney, Agent, or Firm—David R. Treacy

[57] ABSTRACT

A rotary mechanical drive for transmitting rotational movement in either a clockwise or counter-clockwise direction. The drive has first, second and third drive members. Interferring surfaces between the first and second members provide positive drive between those members in a first angular direction. Interferring surfaces between the second and third members provide positive drive in a second angular direction. Spring couplings between the first and second members and the second and third members permit manual override of the drive in a direction which is opposite to the positive drive direction.

3 Claims, 10 Drawing Figures

MECHANICAL DRIVE WITH BI-DIRECTIONAL OVERRIDE

BACKGROUND OF THE INVENTION

The invention relates to mechanisms for transmitting mechanical forces and particularly to mechanisms for transmitting motion which allow a manual override. The prior art includes various mechanisms that will transfer the drive means for a given apparatus from a manual apparatus to a motor driven apparatus. An example of an apparatus which is generally of this type is disclosed in U.S. Pat. No. 3,791,071. The apparatus includes an axially movable member which is moved to vary the drive for a window in an automobile between a manual drive and an electric motor drive. A disadvantage of such apparatus is that there is no position reference to permit accurate control of an apparatus in a wide number of discrete positions. In the apparatus in the above-referred to patent, a D.C. motor is ordinarily used to power a window mechanism until a physical limit switch interrupts power to that motor. For an increasing number of applications it is highly desirable to use a digital computer to drive a stepping motor which is driven by pulsed direct current power. The stepping motor frequently will be driven through a plurality of discrete steps with each of the steps being of equal angular extent which can be determined in advance. This permits the operation of the motor in an open loop mode without compromising the precision with which the apparatus is positioned.

In the automotive field the more stringent requirements for emissions control and fuel economy have made it highly desirable to use a digital computer to control various mechanisms. One such mechanism is the choke plate in the carburetor of a typical internal combustion engine. If an ordinary mechanical drive is used to couple a stepping motor and the choke plate, there are various conditions when the mechanism is vunerable to damage. One such condition occurs when there is a backfire through the carburetor. It is conventional to mount the choke plate in a carburetor with the axis of the choke plate asymmetric with respect to the geometric axis of the choke plate. The passage of a large amount of gas and vapor as a result of a backfire will inherently produce a rotational moment about the axis of the mounting shaft for the choke plate. This moment will tend to damage any gear train that is mechanically connected to the mounting shaft of the choke plate and an associated stepping motor. In some cases it may also move the stepping motor a number of discrete steps and this will result in the digital computer acting on the basis of an assumed initial position which will be incorrect. This follows since the computer is operating in an open loop mode. Other circumstances where such positional changes and damage to the gear train may occur are when a mechanic forceably positions the choke plate toward either an open or a closed position to either start an automobile or to conduct some other tests.

Another reason for using digital computers to drive stepping motors in automobiles is that the large number of pneumatic controls now required to meet emissions and economy standards has created a problem in that the vacuum available may not be sufficient to reliably and consistently operate all of the various controls under all of the various operating conditions of the engine. A related problem is that a large number of tubes connected to the intake manifold are also vunerable to leakage and accordingly disrupt the normal operations of the various mechanisms.

It is an object of the invention to provide apparatus which will provide the advantage of the precise mechanical positioning of apparatus such as a choke plate of a carburetor with provision for mechanical override of that mechanism for a finite period of time after which the apparatus will return to either the original position or any new position which is dictated by an input from a stepping motor. Stated another way the override mechanism will have a memory.

It is another object of the invention to provide apparatus which allow manual override in both angular directions.

It is yet another object of the invention to provide apparatus which will precisely control the position of a choke plate or other similar apparatus in a manner which will not be subject to variation because of natural forces such as the flow of air into the carburetor which will produce a moment about the mounting shaft for the choke plate because of the asymmetric location of the mounting shaft for the choke plate.

SUMMARY OF THE INVENTION

It has now been found that these and other objects of the invention may be attained in an apparatus which includes a first member mounted for movement in first and second directions, a second member mounted for movement in first and second directions and a third member which is also mounted for movement in first and second directions. First and second members each have interferring surfaces which transfer motion therebetween in the first direction. The second and third members have interferring surfaces which transfer motion therebetween in the second direction. First means are provided for transferring motion between the first and second members in the second direction responsive to a force greater than a predetermined minimum. The apparatus further includes second means for transferring motion between the second and third members in a first direction responsive to a force greater than a predetermined minimum.

In one form of the invention the first means comprises a first spring and the second means comprises a second spring. The first and second springs may be coil springs. The first direction may be clockwise and the second direction may be counter-clockwise in one form of the invention. In another form of the invention the first direction and the second direction may be opposite linear directions.

BRIEF DESCRIPTION OF THE DRAWING

The invention will be better understood by reference to the accompanying drawing in which.

DESCRIPTION OF THE PREFERRED EMBODIMENT

Figure 2:
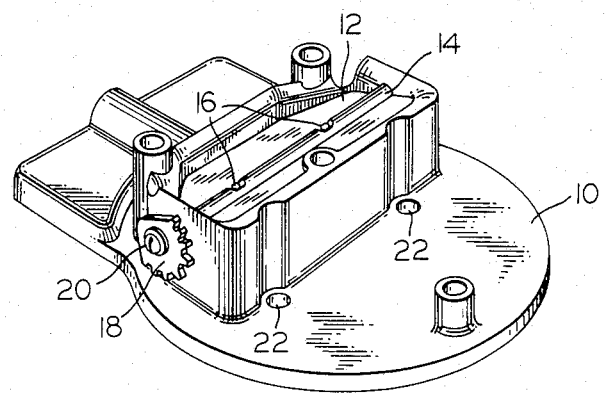
FIG. 2 is a perspective view of a portion of a carburetor adapted for cooperation with the apparatus shown in FIG. 1.

Referring now to FIG. 2 there is shown an upper housing 10 for a carburetor. A choke plate 12 is fixed to a shaft 14 by means of machine screws 16. The shaft 14 is free to rotate with respect to the housing 10. A gear segment 18 is fixed to one axial extremity of the shaft 14 by means of a machine screw 20. In one application of the invention the gear 18 is positioned to in turn position the choke plate 12. A difficulty arises if a mechanic forces the choke plate 12 to either an open or close position or if a backfire through the engine causes gas to impinge on the choke plate 12 (which is asymmetrically mounted) and thereby produce a force on the drive train for the gear 18.

Referring now to FIGS. 1, 3, 4, 5, and 6 there is shown a drive mechanism which is mounted by a suitable bracket (not shown) which engages holes 22 in housing 10. The mechanism shown in these figures includes the same gear 18, housing 10 and choke plate 12. The override mechanism includes three discs 24, 26, 28. Each of these discs is mounted on a shaft 3. Discs 26 and 28 are mounted to rotate freely with respect to that shaft 30. The disc 24 includes a cylindrical stop 32 which is fixed to the disc 24 at a distance from the center line of the shaft 30. The disc 26 includes stops 34 and 36 which are fixed to that disc at the same distance from the center line of the shaft 30 as is the stop 32 from the center line of the shaft 30. It will be understood that in practice the stops 34 and 36 may be single piece of bar stock which is positioned in a hole within disc 26. For the purposes of this explanation, however, the clarity is enhanced by referring to the stops as two discrete elements. Disc or gear 28 is also provided with a stop 38 which is also disposed the same radial distance from the axis 30 as is the stop 32 on disc 24. It will be seen that the stops 32 and 34 extend axially so that they interfere in one rotational direction of movement. Similarly, the stops 36 and 38 extend axially a sufficient amount so that they will interfere in the other rotational direction of movement.

The stops 32 and 34 are coupled together by a torsion spring 40 which extends around the shaft 30 and has extremities which engage the stops 32 and 34. Similarly a second torsion spring 42 is disposed around the shaft 30 and has extremities which engage the stops 36 and 38.

The drive train includes a stepping motor 44 having an output shaft 46 on which is fixed a gear 48 which engages a gear 50 which is fixed to a shaft 52 as is a smaller gear 54. The periphery of disc or gear 28 is also provided with gear teeth which cooperate with the teeth of gear 52.

A gear 56 is fixed to the shaft 30 as is the disc 24. The gear 56 engages a gear 58 mounted on a shaft 60.

Figure 1:
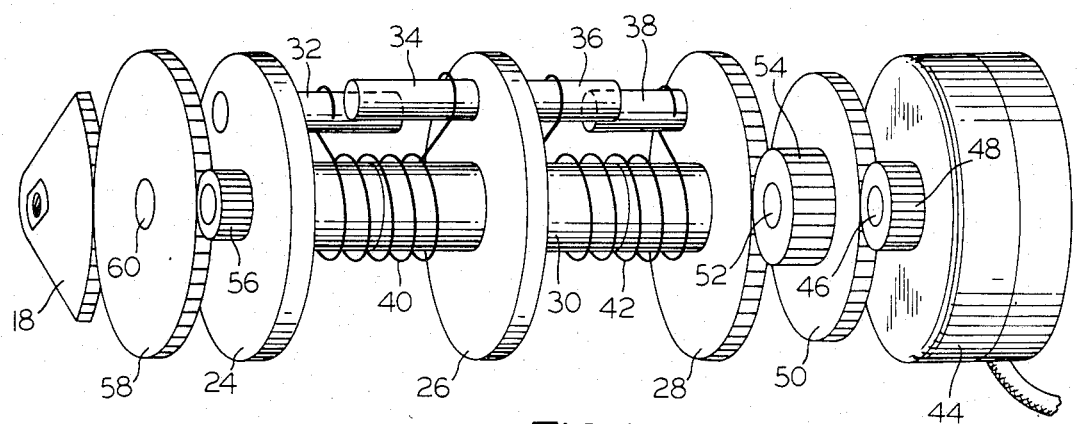
FIG. 1 is a perspective view of a stepping motor and drive assembly in accordance with one form of the invention.

In operation the discs 24, 26 and 28 are normally positioned as shown in FIG. 1. Rotational movement of the stepping motor 44 successively rotates gears 48, 50, 54 and 28. In normal operation a rotational force on disc or gear 28 is transmitted in one direction through torsion spring 42 to disc 26 and thence by member 34 to member 32 to disc 24 and gear 56 which in turn causes gear 58 to rotate gear 18 and the choke plate 12. In normal operation the only difference in the reverse direction of movement is that the member 38 on disc 28 interferes with member 36 on disc 26 to transmit rotational movement and torsion spring 40 maintains the members 32 and 34 in abutting relationship to transmit the rotational force to disc 24.

Figure 3:
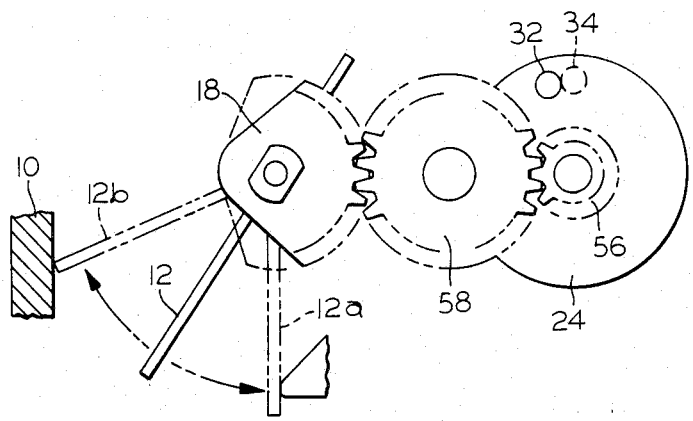
FIG. 3 is a schematic view of a portion of the apparatus shown in FIG. 1.
Figure 4:
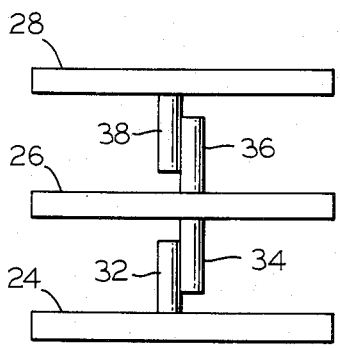
FIGS. 4, 5 and 6 are schematic views of portions of the apparatus shown in FIG. 1 during static conditions, an override condition with a clockwise overriding force, and an override condition with a counter-clockwise overriding force.
Figure 5:
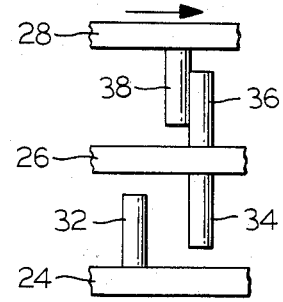
Figure 6:
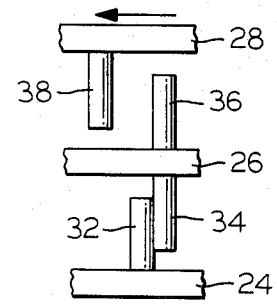

When, however, a force is, for example, imposed in the choke plate 12 such as by a backfire or by a mechanics screwdriver the physical relationships illustrated in simplified form in FIG. 4 will no longer continue and the relationship illustrated in simplified form in either FIGS. 5 and 6 will exist. Referring specifically to FIG. 5 and FIG. 3, if a clockwise force (as viewed in FIG. 3) is imposed on the choke plate 12 to move it to the position identified by the numeral 12a the torsion spring 40 will allow relative movement between stops 32 and 34. In other words they will move apart as is shown in FIG. 5. It will understood that if the clockwise force on the choke plate 12 is relaxed the drive mechanism will return to its original position and thus will have a memory.

In a similar manner if a counter-clockwise force is imposed on the choke plate 12, against the force which is produced by the stepping motor 44 the torsion spring 42 coupling interference elements 36 and 38 will be overcome and the elements will move to the position shown in FIG. 6. Also in a similar manner the release of the force will cause the mechanism to return to the position shown in FIG. 4 (because of the force of the torsion springs) and hence to the original position before the external force was applied.

Figure 10:
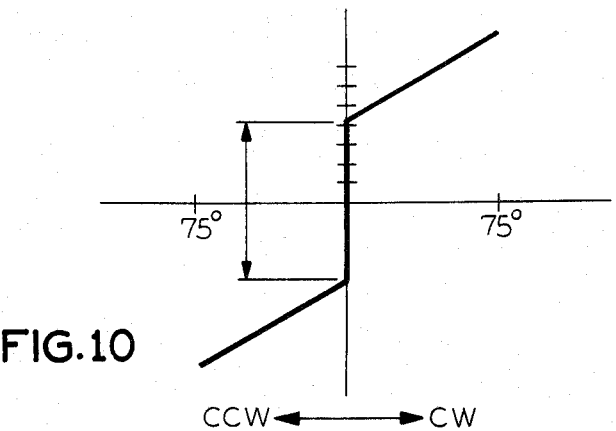
FIG. 10 is a graph illustrating the torque characteristics of the apparatus in accordance with the invention.

Referring now to FIG. 10 there is shown a graph of the torque required to override the drive mechanism. The horizontal axis represents angular position of the choke plate 12 and the vertical axis represents force. It will be seen that there is a deadband such that some finite amount of force is necessary before one of the torsion springs 40, 42 deflects from the position shown in FIG. 1 and the normal drive mechanism is overridden. (Each of the springs 40, 42 is installed as shown in FIG. 1 with an initial preload. It is this preload that results in the deadband.) This feature of the invention is essential to ensure that under normal operating conditions the position of the choke plate 12 is exactly as desired for some optimum operating condition as determined by a digital computer (not shown). A finite amount of deadband is necessary to ensure that external forces such as the force imposed by the flow of air over the choke plate 12 and into the carburetor does not change the choke plate 12 position from that determined to be optimum by the digital computer. It has been found that the torsion springs 40, 42 should be sized and installed with a preload so that a minimum torque of 10–15 ounce inches is necessary to override the mechanism and specifically to separate either elements 36 and 38 or elements 32 and 34.

Figure 7:
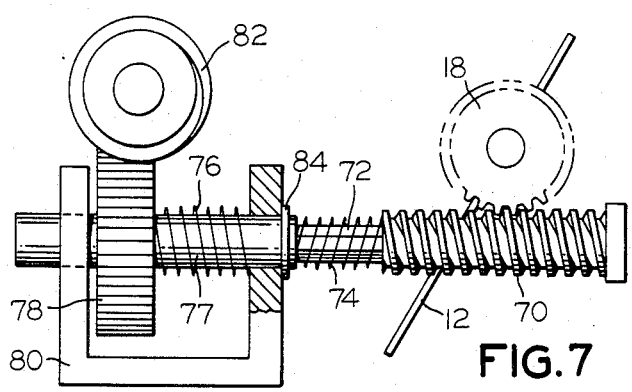
FIGS. 7, 8 and 9 are elevational views of another embodiment of the invention in various operational modes.
Figure 8:
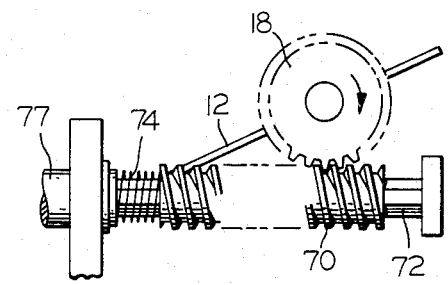
Figure 9:
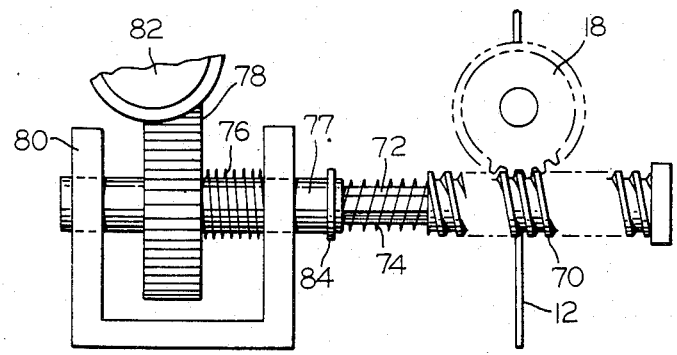

Referring now to FIGS. 7, 8 and 9 there is shown another embodiment of the invention which utilizes compression springs and axial movement of members as opposed to the rotational movement with torsion springs in the preferred embodiment shown in FIG. 1. Gear 18 and choke plate 12 are structured and mounted as in the preferred embodiment. A worm gear 70 having a hexagonal cross-section bore (not shown) cooperates with a hexagonal cross-section shaft 72 to allow sliding axial movement therebetween and prevents rotational movement therebetween. When the choke plate 12 is rotated clockwise as shown in FIG. 8 the gear 18 drives the worm 70 the left as shown. The worm is allowed to slide on the shaft 72 and accordingly compresses a spring 74 which ordinarily biasses the worm 70 to right as shown. When the choke plate 12 is rotated counter-clockwise as shown in FIG. 9 the worm 70 is forced to the right as shown against a stop 74. This force against the stop 74 causes the shaft 72 to move axially to the right as shown in FIG. 9 causing spring 76 which is mounted between gear 78 and yoke 80 on a shaft 77. The shaft 77 may be integral with shaft 72 and in any construction will be fixed to shaft 72 so that no angular or axial relative motion between the shafts is possible. Gear 78 is fixed to shaft 77. The gear 78 is fixed to the shaft 72. The gear 78 is driven by gear 82 within a range of axial positions of gear 78 as best seen in FIGS. 7 and 9. When the counter-clockwise force is removed from the choke plate 12 the spring 76 forces the shaft 72 to return to the left until a retaining ring 84 abuts the side of yoke 80. The spring rates of springs 74 and 76 will be chosen to achieve the desired deadband characteristics illustrated in FIG. 10.

It will be understood that the apparatus in accordance with the invention may be used for a wide variety of other applications which may or may not be automotive in nature. Some automotive application include a throttle plate positioner for use in certain motor generator applications where it is desired to have precise control of the frequency and the throttle plate is also asymmetric which may again cause a backfire problem. Various cruise control apparatus in automobiles may also require this override type mechanism.

The term "coil spring" as used herein will be understood to be generic to torsion compression and tension coil springs. Those skilled in the art will recognize various alternate biasing means which may be used without departing from the spirit of the invention.

Having thus described my invention I claim:

1. Apparatus for transferring motion which comprises: a first member mounted for movement in first and second directions, a second member mounted for movement in first and second directions, a third member mounted for movement responsive to movement of at least one of said first and second members in either said first or second direction, said first and second members having interferring surfaces which transfer motion therebetween in said first direction, said second and third members having interferring surfaces which transfer motion therebetween in said second direction, first means for transferring motion between said first and second members in said second direction responsive to a force greater than a predetermined minimum, and second means for transferring motion between said second and third members in said first direction responsive to a force greater than a predetermined minimum, said first means and second means each comprising a first torsion coil spring which is preloaded to provide a non-linear force characteristic, each of said torsion coil springs being wound more tightly (to a smaller diameter) when motion is transferred thereby.

2. The apparatus as described in claim 1 wherein said first direction is clockwise.

3. The apparatus as described in claim 1 said second direction is counter-clockwise.

* * * * *